United States Patent
Sobel et al.

(10) Patent No.: US 7,606,807 B1
(45) Date of Patent: Oct. 20, 2009

(54) METHOD AND APPARATUS TO UTILIZE FREE CACHE IN A STORAGE SYSTEM

(75) Inventors: Jason S. Sobel, Santa Clara, CA (US); Jonathan T. Wall, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 303 days.

(21) Appl. No.: 11/354,600

(22) Filed: Feb. 14, 2006

(51) Int. Cl.
  *G06F 17/30* (2006.01)
(52) U.S. Cl. .............................. 707/10; 711/3; 711/131
(58) Field of Classification Search ........................ None
  See application file for complete search history.

(56) References Cited

U.S. PATENT DOCUMENTS 6,757,769 B1 * 6/2004 Ofer .......................... 710/200
2002/0056025 A1 * 5/2002 Qiu et al. .................... 711/133
2002/0078303 A1 * 6/2002 Rozario et al. ............... 711/133
2002/0099729 A1 * 7/2002 Chandrasekaran et al. .. 707/203
2004/0123028 A1 * 6/2004 Kanai et al. .................. 711/113

* cited by examiner

*Primary Examiner*—Pierre M Vital
*Assistant Examiner*—Truong V Vo
(74) *Attorney, Agent, or Firm*—Blakely, Sokoloff, Taylor & Zafman LLP

(57) ABSTRACT

A system is provided to improve performance of a storage system. The system comprises a multi-tier buffer cache. The buffer cache may include a global cache to store resources for servicing requests issued from one or more processes at the same time, a free cache to receive resources from the global cache and to store the received resources as free resources, and a local cache to receive free resources from the free cache, the received free resources to store resources that can be accessed by a single process at one time. The system may further include a buffer cache manager to manage transferring resources from the global cache to the free cache and from the free cache to the local cache.

10 Claims, 6 Drawing Sheets

METHOD AND APPARATUS TO UTILIZE FREE CACHE IN A STORAGE SYSTEM

FIELD OF THE INVENTION

At least one embodiment of the present invention pertains to network storage systems and more particularly, to a method and apparatus to utilize free cache in a storage system.

BACKGROUND

Multi-processor computing systems are becoming increasingly more common in a variety of applications. A multi-processor system is one which includes multiple processors, where the processors can be physical processors, logical processors, or a combination thereof. In order to ensure that instructions and data are safe for execution in a multi-processor environment, various processes implemented by the operating system can be organized into a number of mutually exclusive domains according to their functionality. A "domain", in this context, is a grouping of processes. Every process capable of execution by the processing device is assigned to exactly one domain. Two processes in different domains operating on the same data simultaneously must use locking to protect the data. Since only one process from a given domain can run at any point in time, processes in the same domain do not need to use locking to protect shared data.

Some systems implement the above-mentioned technique in a storage server or a networked storage system. A networked storage system may include one or more storage servers, which may be storage appliances. A storage server may provide services related to the organization of data on mass storage devices, such as disks. Some of these storage servers are commonly referred to as filers or file servers. An example of such a storage server is any of the Filer products made by Network Appliance, Inc. in Sunnyvale, Calif. The storage appliance may be implemented with a special-purpose computer or a general-purpose computer. Depending on the application, various networked storage systems may include different numbers of storage servers. A storage server typically runs a storage operating system.

The domains of a storage operating system running on a storage server can be organized according to the critical path pipeline of the storage server. For example, a critical path pipeline is when a storage server receives a data access request (read or write) from a client over a network, a network software layer of the storage server sends an appropriate message to the storage server's file system, which processes the message to determine where the corresponding data is stored, and which then forwards a corresponding message to a storage software layer of the storage server. Each of these phases of processing the request is carried out by a different stage in the pipeline; as such, a separate domain can be created for each stage, e.g., a domain for all network-specific processes of the storage server, a domain for all file system-related processes of the storage server, a domain for all storage-specific processes of the storage server, etc.

It has been observed in certain storage servers that allow multiple messages to be running in parallel, that the allocation of resources tends to be a bottleneck in the critical path of the storage server, thus limiting the throughput of the storage server. Specifically, this phenomenon may be observed in systems that utilize a global pool of resources that may require explicit locking (e.g., via a lock command).

SUMMARY

A system and method are provided to utilize free cache in a storage system. The system comprises a multi-tier buffer cache. The buffer cache may include a global cache to store resources for servicing requests issued from one or more processes at the same time, a free cache to receive resources from the global cache and to store the received resources as free resources, and a local cache to receive free resources from the free cache. File system operations may take resources form the local cache as needed without locking. The system may further include a buffer cache manager to manage transferring resources from the global cache to the free cache and from the free cache to the local cache.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
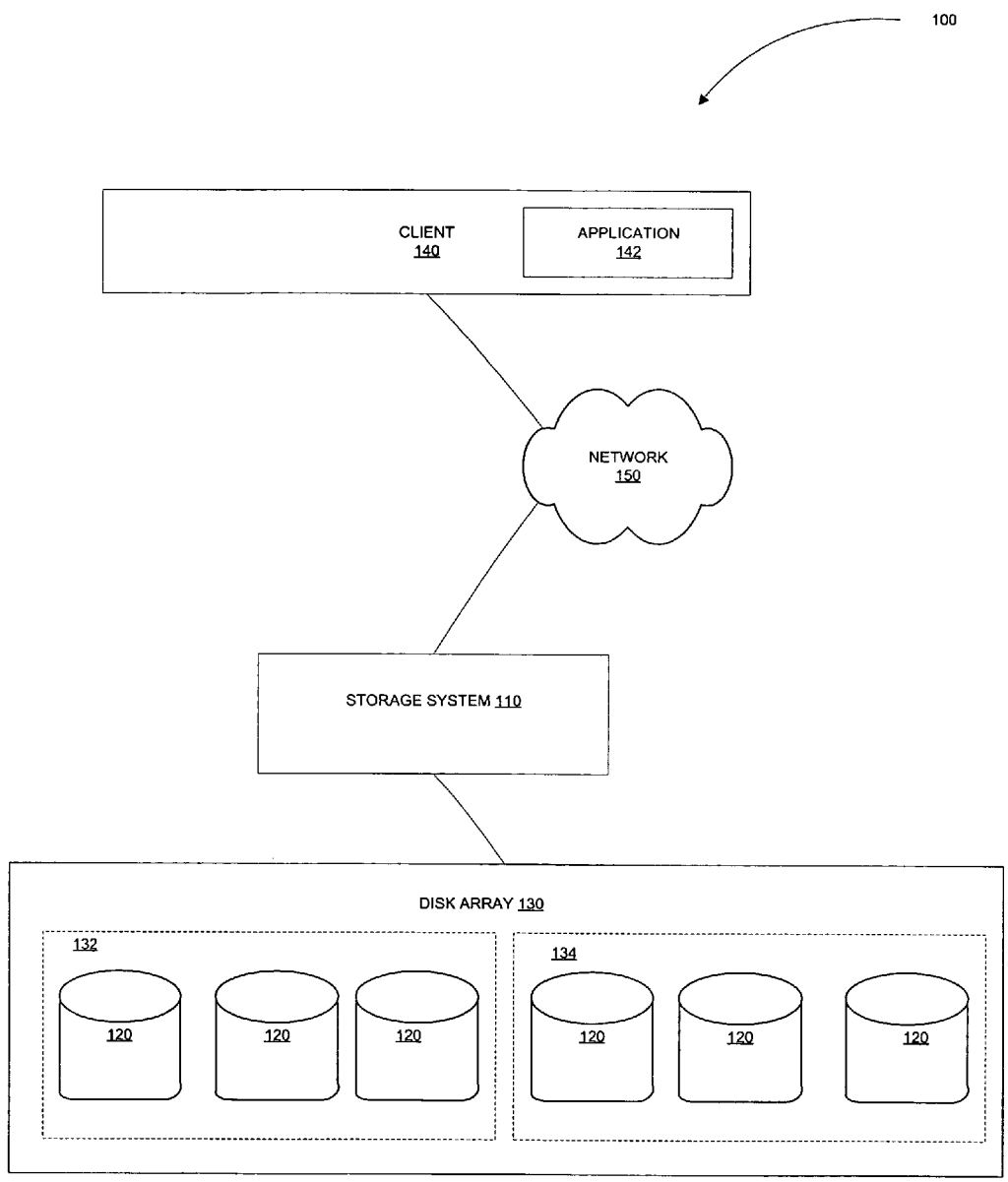
FIG. 1 is a schematic block diagram of an environment including a storage system that may be used with one embodiment of the present invention.

As described in detail below, the technique introduced herein addresses issues associated with improving performance of a storage system. In one embodiment, in order to allow unlocked allocation of resources for file system messages, a separate pool for buffers may be implemented in addition to the global buffer cache. In addition to this separate pool for buffers, one or more local caches may be implemented. While the global cache may store resources for servicing requests for resources from multiple processes running in parallel and therefore requires explicit locking so that buffer contents are protected from being modified by multiple processes, a local cache may be configured to store resources for servicing requests for resources from a single process at one time and therefore may not require locking the local cache. A file system message may operate in a load phase and in a modify phase. During the load phase, the resources that are needed for the processing of the message are being acquired. During the modify phase, the message is being processed. In one embodiment, when a file system component (e.g., a buffer cache manager) pre-allocates resources that are necessary for servicing the request (e.g., a certain number of buffers) for a file system message, the buffer cache manager may transfer the needed number of buffers to a local cache. A local cache may be configured to store resources that can only be accessed by a process associated with a particular central processing unit (CPU). The local cache may then be referred to as a per-CPU cache. Thus, when a file system message tries to allocate the resources in its modify phase, the resources may be acquired form an associated per-CPU cache without any locking.

Thus, in one embodiment, rather than acquiring resources directly from a global cache, a message obtains resources from a local cache that does not require explicit locking. A background process may search the global cache to identify the buffers in the global cache that may be freed, and then transfer such resources to the free cache. The transfer of resources from the global cache to the free cache may be performed in a batch mode, such that a plurality of resources may be transferred during one operation.

When the free cache runs out of resources, a message (e.g., a request from a client or a system request) may be sent to a file system domain to request a refill of the free cache. In one embodiment only one message can run in the file system domain at one time. Therefore, the global cache does not need to be explicitly locked while the refill message is being processed.

In one embodiment, the present invention may be implemented in the context of a storage-oriented network, e.g., a network that includes one or more storage servers that store and retrieve data on behalf of one or more clients. Such a network may be used, for example, to provide multiple users with access to shared data or to backup mission critical data. An example of such a network is illustrated in FIG. 1.

FIG. 1 is a schematic block diagram of an environment 100 including a storage system 110 that may be advantageously used with one embodiment of the present invention. The storage system 110, in one embodiment, may be configured to access information requested by clients such as a client 140 via a network 150. For example, the storage system 110 may store files created or modified by an application 142 running on the client 140.

The storage system 110 may store data on any type of attached array of writable storage device media such as video tape, optical, DVD, magnetic tape, bubble memory, electronic random access memory, micro-electro mechanical and any other similar media adapted to store information, including data and parity information. However, as illustratively described herein, the data is preferably stored on disks 120, such as HDD and/or DASD, of an array 130.

In one embodiment, storage of information on array 130 may be implemented as one or more storage "volumes," such as a volume 132 and a volume 134, that comprise a collection of physical storage disks 120 cooperating to define an overall logical arrangement of (virtual block number) vbn space on the volumes. Each logical volume is generally, although not necessarily, associated with its own file system. The disks within a logical volume are typically organized as one or more groups, wherein each group may be operated as a RAID. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it will be understood that other types and levels of RAID implementations may be used in accordance with the inventive principles described herein.

As noted above the storage system 110 may service client requests over the computer network 150. The computer network 150 may comprise a point-to-point connection or a shared medium, such as a local area network. Illustratively, the computer network 150 may be embodied as an Ethernet network or a Fibre Channel (FC) network. The client 140 may communicate with the storage system over network 150 by exchanging discrete frames or packets of data according to pre-defined protocols, such as the Transmission Control Protocol/Internet Protocol (TCP/IP).

The client 140 may be a general-purpose computer configured to execute applications 142. Moreover, the client 140 may interact with the storage system 110 in accordance with a client/server model of information delivery. That is, the client may request the services of the storage system, and the system may return the results of the services requested by the client by exchanging packets over the network 150. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

It will be noted that any or all of the components of system 100 and associated hardware may be used in various embodiments of the present invention. However, other configurations of the networked data storage system may include more or fewer devices discussed above.

Figure 2:
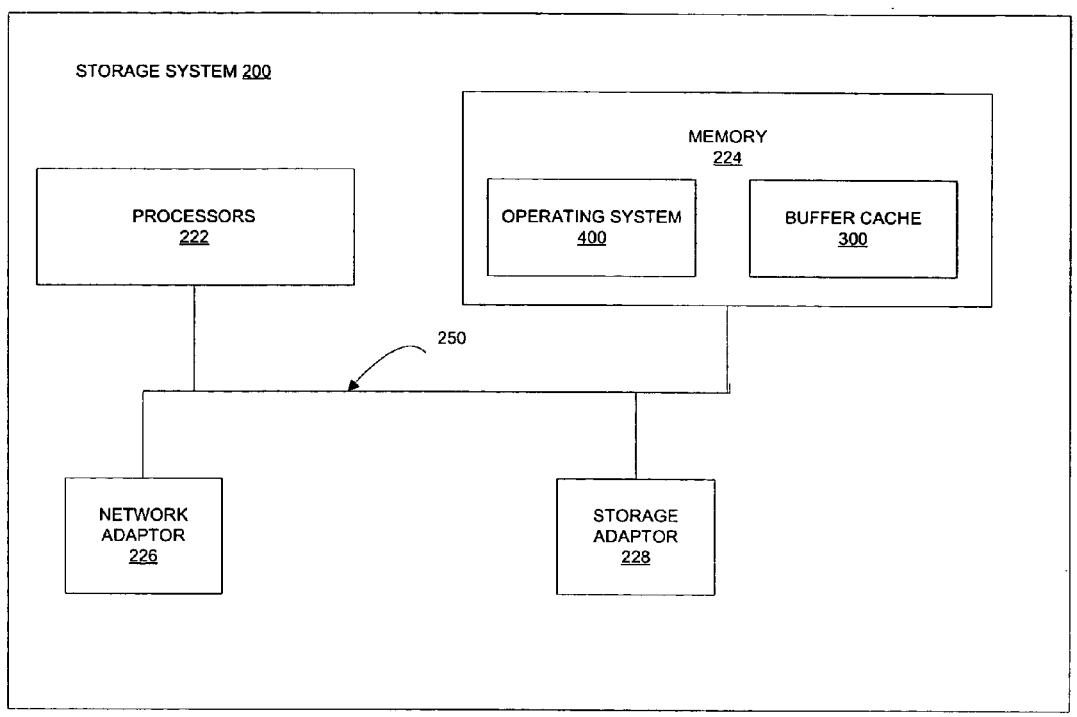
FIG. 2 is a schematic block diagram of a storage server that may be used with one embodiment of the present invention.

Additional details of one embodiment of a storage server are illustrated in FIG. 2. A storage system 200 comprises one or more processors 222, a memory 224 (e.g., a random access memory (RAM)), a network adaptor 226, and a storage adaptor 228, interconnected by a system bus 250. In one illustrative embodiment, the storage system 200 is a multi-processor system that includes multiple processors 222, where the processors can be physical processors, logical processors, or a combination thereof. A single physical processor can implement multiple logical processors. In such an implementation, the logical processors generally have some private state, but a portion of the state is shared.

In the illustrative embodiment, the memory 224 comprises storage locations that are addressable by the processor and adaptors for storing software program code. A storage operating system 400, portions of which are typically resident in memory and executed by the processing elements, functionally organizes the system 200 by, inter alia, invoking storage operations executed by the storage system. It will be apparent to those skilled in the art that other processing and memory means, including various computer readable media, may be used for storing and executing program instructions pertaining to the inventive technique described herein.

The storage operating system 400 can be organized into a number of mutual exclusion domains according to their functionality. A "domain", in this context, is a grouping of processes, where the grouping may be performed at compile time. Every process capable of execution by the storage system 200 may be assigned to one specific domain. The domains, in one embodiment, are defined according to functionality so that it is not permitted for two processes in different domains to operate on the same data simultaneously. Furthermore, only one process at a time can execute in each domain.

The network adaptor 226 comprises the mechanical, electrical and signaling circuitry needed to connect the storage system 200 to clients (e.g., the clients 140 of FIG. 10) over a computer network. The storage adaptor 228 cooperates with the storage operating system 400 executing on the system 200 to access information requested by a user (or client).

A portion of the memory 224 may be further organized as a buffer cache 300 for storing certain data structures associated with the present invention. In one illustrative embodiment, the buffer cache 300 may be implemented to have multi-tier architecture, as described in further detail below.

Figure 3:
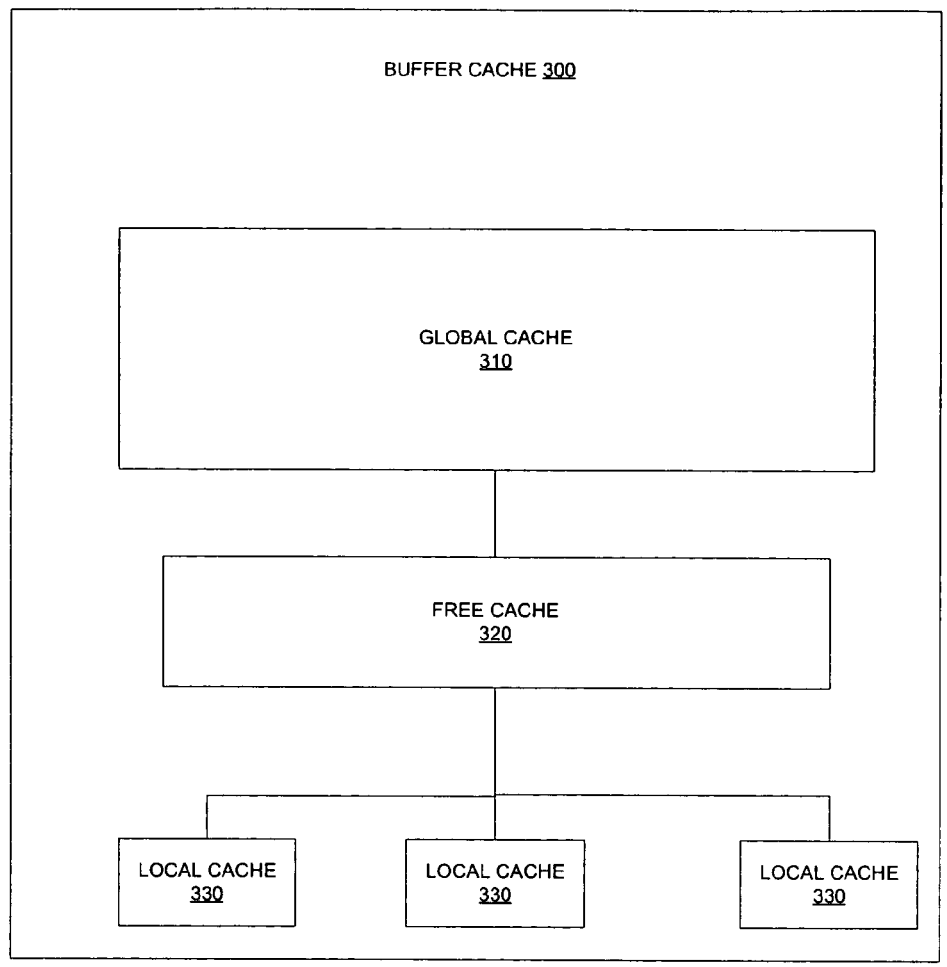
FIG. 3 is a schematic block diagram of a buffer cache that may be used with one embodiment of the present invention.

FIG. 3 illustrates the buffer cache 300 in greater detail, according to one embodiment of the invention. As shown in FIG. 3, the buffer cache 300 is organized as a global cache 310, a free cache 320 and a number of local caches 330. The global cache 310, in one embodiment may be configured to store resources for servicing requests issued from multiple processes at the same time. When multiple requests contend for resources, a mechanism may be put in place to give a lock to a first request that that is manipulating the resources in the global cache 310 so no other request may access the resources stored in the global cache 310 until the first request completes manipulating the resources in the global cache 310. The lock is released when the request completes manipulating the resources in the global cache 310, so that the lock may be given to the next request.

The free cache 320 may be configured to receive resources from the global cache 310 and to store the received resources as free resources in the free cache 320. The resources stored in the free cache 320 may, in turn, be transferred to the local caches 330, as becomes necessary. Each local cache 330, in one embodiment, may be associated with a separate CPU. A component of a storage operating system may be implemented to search lists of buffers stored in the global cache 310, select the resources that can be freed, and transfer such resources, e.g., in a batch, to the free cache 320.

In one embodiment, the transfer of resources from the global cache 310 to the free cache 320 may be performed in the background, e.g., by a low priority process. For example, a watermark value (e.g., a threshold value of free cache being certain percent full) may be predetermined for the free cache 320, such that a low priority process may start transferring resources from the global cache 310 into the free cache 320 (or refilling the free cache 320), when the amount of resources in the free cache 310 is determined to be below the watermark. While the resources are being pulled out of the free cache 320 into one of the local caches 330, the free cache 320 is locked for a brief period of time.

The local caches 330, as mentioned earlier, may be configured to service file system requests while only a single request is attempting to allocate resources at one time. Thus, when requests acquire resources from the local cache 330, no explicit locking is utilized.

In order to manage the transferring of resources from the global cache 310 to the free cache 320 and from the free cache 320 to the local caches 330, a storage operating system (e.g., the storage operating system 400 of FIG. 2) may implement a buffer cache management component.

Figure 4:
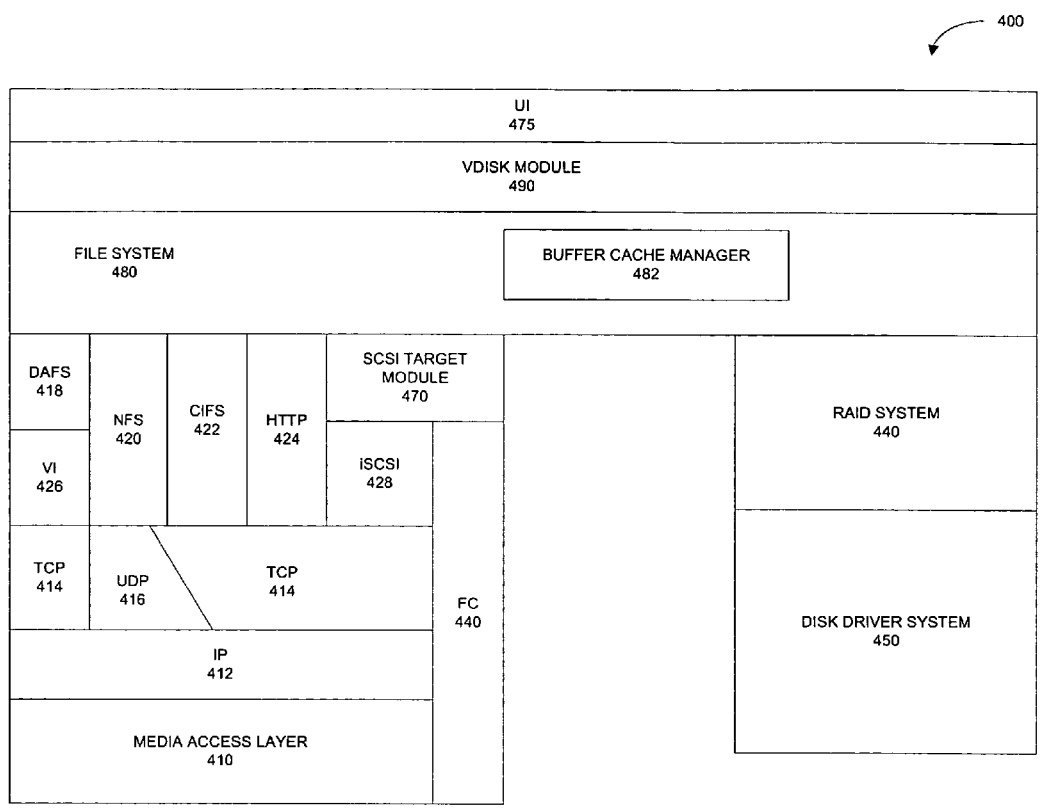
FIG. 4 is a schematic block diagram of a storage operating system that may be used with one embodiment of the present invention.

FIG. 4 illustrates the operating system 400 in greater details according to one embodiment of the invention. As used herein, the term "storage operating system" generally refers to the computer-executable code operable on a computer that manages data access and may implement file system semantics, such as the Data ONTAP® storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications.

The storage operating system 400 comprises a series of software layers organized to form an integrated network protocol stack or, more generally, a multi-protocol engine that provides data paths for clients to access information stored on the storage system using block and file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access and, to that end, includes support for the Direct Access File System (DAFS) protocol 418, the NFS protocol 420, the CIFS protocol 422 and the Hypertext Transfer Protocol (HTTP) protocol 424. A virtual interface (VI) layer 426 implements the VI architecture to provide direct access transport (DAT) capabilities, such as remote direct memory access (RDMA), as required by the DAFS protocol 418.

An iSCSI driver layer 428 provides block protocol access over the TCP/IP network protocol layers, while a FC driver layer 430 receives and transmits block access requests and responses to and from the storage system. The FC and iSCSI drivers provide FC-specific and iSCSI-specific access control to the blocks and, thus, manage exports of LUNs to either iSCSI or FCP or, alternatively, to both iSCSI and FCP when accessing the blocks on the storage system. In addition, the storage operating system includes a storage module embodied as a RAID system 440 that manages the storage and retrieval of information to and from the volumes/disks in accordance with I/O operations, and a disk driver system 450 that implements a disk access protocol such as, e.g., the SCSI protocol.

Bridging the disk software layers with the integrated network protocol stack layers is a virtualization system that is implemented by a file system 480 interacting with virtualization modules illustratively embodied as, e.g., vdisk module 490 and SCSI target module 470. The vdisk module 490 is layered on the file system 480 to enable access by administrative interfaces, such as a user interface (UI) 475, in response to a user (system administrator) issuing commands to the storage system. The SCSI target module 470 is disposed to provide a translation layer of the virtualization system between the block (LUN) space and the file system space, where LUN s are represented as blocks. The UI 475 is disposed over the storage operating system in a manner that enables administrative or user access to the various layers and systems.

The file system 480 is illustratively a message-based system that provides logical volume management capabilities for use in access to the information stored on the storage devices, such as disks. That is, in addition to providing file system semantics, the file system 480 provides functions associated with a volume manager. These functions include (i) aggregation of the disks, (ii) aggregation of storage bandwidth of the disks, and (iii) reliability guarantees, such as mirroring and/or parity (RAID). The file system 480 illustratively implements a write anywhere file system having an on-disk format representation that is block-based using, e.g., 4 kilobyte (kB) blocks and using index nodes ("inodes") to identify files and file attributes (such as creation time, access permissions, size and block location).

The file system 480, in one embodiment, may include a buffer cache manager 482 to manage the transferring of resources from the global cache 310 to the free cache 320 and from the free cache 320 to the local caches 330. The buffer cache manager 482 will be described in further detail with reference to FIG. 5 below.

Figure 5:
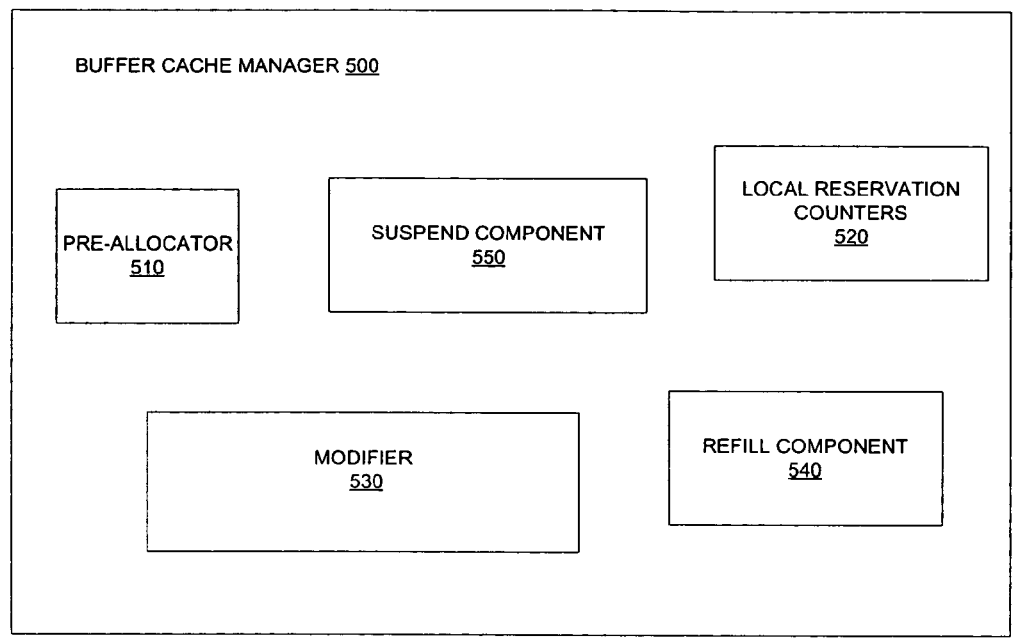
FIG. 5 is a schematic block diagram of a cache manager, according to one embodiment of the present invention.

FIG. 5 is a schematic block diagram of a buffer cache manager 400, according to one embodiment of the present invention. The buffer cache manager 400 may include a pre-allocator 510 to pre-allocate resources necessary to service a request (the necessary resources), local reservation counters 520 to keep track of the amount of resources in the free cache that are reserved for transfer to local caches, and a modifier 530 to pull resources necessary to service the request out of the local cache to service the request. The buffer cache manager 400 may further include a refill component 540 to transfer some resources from the global cache to the free cache if the amount of resources in the free cache is below a watermark, and a suspend component 550 to suspend the request if an associated local cache cannot acquire sufficient resources from the free cache without a request to refill the free cache. An example of the operation of the components of the buffer cache manager 400 is discussed with reference to FIG. 6.

Figure 6:
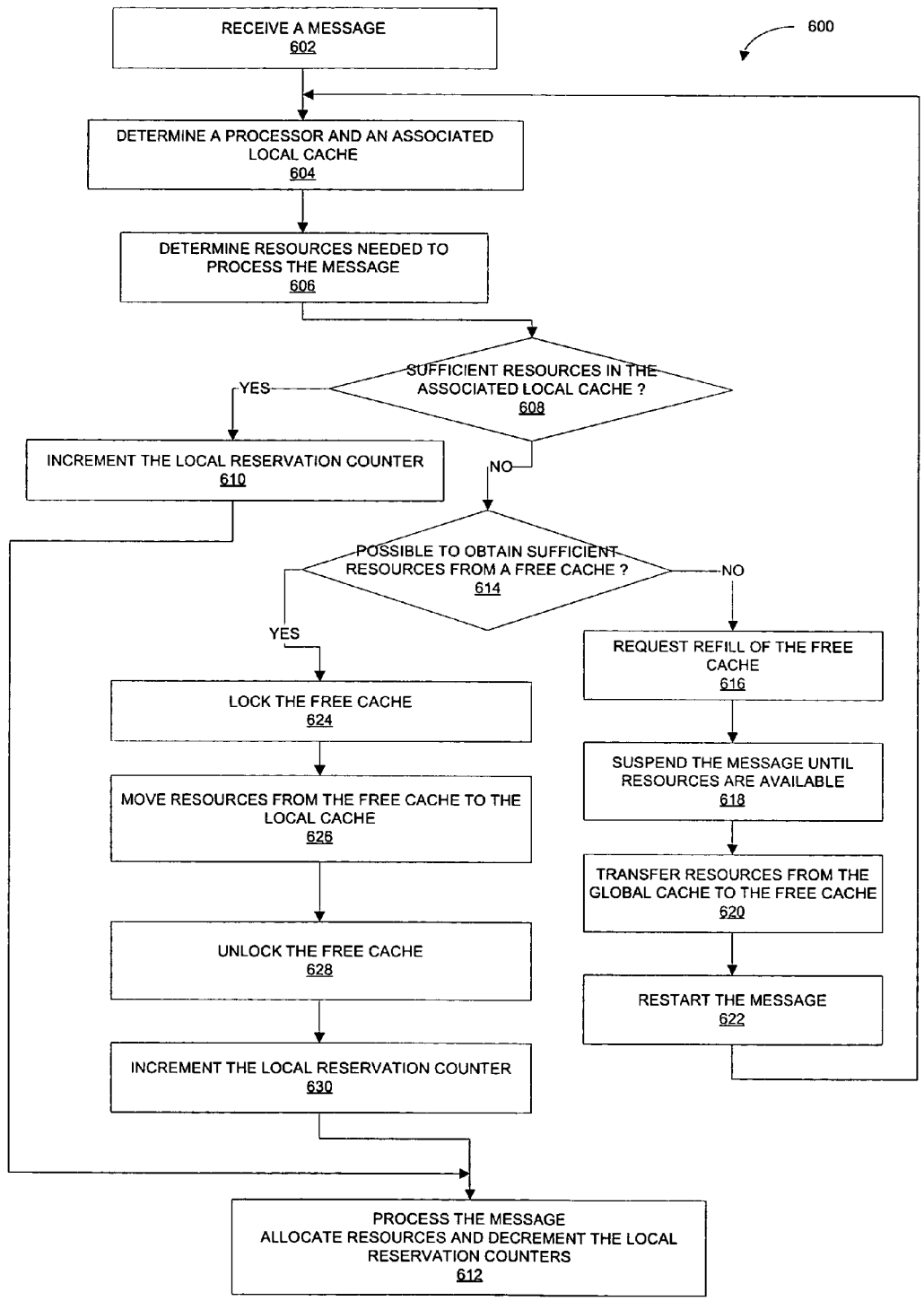
FIG. 6 is a flow chart illustrating a method to utilize free cache in a storage system, according to embodiments of the invention.

FIG. 6 is a flowchart illustrating a method 600 to improve performance of a storage system, according to one embodiment of the present invention. The method may be performed by processing logic that may comprise hardware (e.g., dedicated logic, programmable logic, microcode, etc.), software (such as run on a general purpose computer system or a dedicated machine), or a combination of both.

Referring to FIG. 6, the method 600 begins at operation 602 with processing logic receiving a message (e.g., a file system request). The pre-allocator 510 determines an associated local cache at block 604. In one embodiment, the pre-allocator 510 first determines a domain associated with the message and a CPU that is responsible for processing messages in the determined domain. The pre-allocator 510 may then identify which local cache is associated with the determined CPU.

At block 606, the pre-allocator 510 determines resources that are necessary to process the message. If sufficient resources are present in the determined local cache (block 608), the pre-allocator 510 increments the associated local reservation counter and passes control to the modifier 530. The modifier 530 processes the message, allocates the resources, and decrements the local reservation counter at block 612.

If the pre-allocator 510 determined that the local cache does not have sufficient resources for processing the message (block 608), the pre-allocator attempts to obtain the resources that are necessary to service a request from the free cache (block 614).

If it is determined, at block 614, that it is possible to obtain the necessary resources from the free cache, the pre-allocator 510 locks the free cache (block 624) to disallow pre-allocation of more resources than are currently available in the free cache and moves the necessary resources from the free cache to the local cache (block 626). The free cache is then unlocked (block 628) and the local reservation counter is incremented (block 630). The pre-allocated resources are then transferred to the local cache (block 620), the reservation counter is decremented (block 622), and the message is processed (block 612). It will be noted, that the free cache is locked while the resources are being transferred from the free cache to the local cache. Once the resources are transferred to from the free cache to the local cache, the free cache is unlocked.

If it is determined, at block 614, that the free cache does not have sufficient resources to be transferred to the local cache, the pre-allocator transfers to the local cache the resources that are available in the free cache. A refill request is sent to the refill component 540 (block 616), and the suspend component 550 suspends the message (block 618) until the resources become available. At block 620, the resources are transferred from the global cache to the free cache, and the message is restarted at block 622. When a message restarts, it may be designated for processing by a different processor, so that the processing logic returns to block 604 to determine the processor and the associated local cache, and the method continues as described above.

Thus, a method and apparatus to utilize free cache in a storage system have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Some portions of the foregoing detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; FLASH memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A storage system comprising:
    a global cache to store resources for servicing requests issued from one or more processes at the same time;
    a free cache to receive resources from the global cache and to store the received resources as free resources;
    a plurality of local caches, wherein each of the plurality of local caches is configured to receive free resources from the free cache, wherein the received free resources in each of the plurality of local caches can be accessed exclusively by a single process at one time; and
    a buffer cache manager to manage reallocating resources from the global cache to the free cache and from the free cache to a local cache, wherein the resources include a buffer, and wherein the buffer cache manager comprises:
        a pre-allocator to pre-allocate resources necessary to service a request by determining whether the necessary resources are present in the local cache and, if the necessary resources are not present in the local cache, attempting to transfer some resources from the free cache to the local cache;
        a refill component to transfer some resources from the global cache to the free cache if the amount of resources in the free cache is below a watermark; and
        a reservation counter to keep track of an amount of resources in the free cache that is reserved for transfer to a local cache.

2. The storage system of claim 1, wherein the buffer cache manager further comprises:
    a modifier to pull the necessary resources out of the local cache to service the request.

3. The storage system of claim 1, wherein the refill component further to transfer some resources from the global cache to the free cache if the pre-allocator fails to transfer resources from the free cache to the local cache in response to determining that the necessary resources are not present in the local cache.

4. The storage system of claim 3, wherein the buffer cache manager further comprises a suspend component to suspend the request if the pre-allocator fails to transfer resources from the free cache.

5. The storage system of claim 1, wherein the refill component is further to select a plurality of resources from resources stored in the global cache and to transfer the plurality of selected resources from the global cache to the free cache in a batch mode.

6. The storage system of claim 1, wherein:
    the pre-allocator further to increment the reservation counter in response to determining that some resources are to be transferred from the free cache to the local cache.

7. The storage system of claim 6, wherein the pre-allocator is to decrement the reservation counter in response to transferring some resources from the free cache to the local cache.

8. The storage system of claim 1, wherein the local cache is from a plurality of local caches.

9. The storage system of claim 1, wherein the local cache is associated with a processor from a plurality of processors.

10. A memory system comprising:
    a global cache to store buffers for servicing file system requests for resources issued in parallel from processes associated with a plurality of central processing units (CPUs);
    a free cache to receive buffers from the global cache in a batch mode and to store the received buffers as free resources;
    a local cache from a plurality of local caches, the local cache to receive free resources from the free cache, wherein the received free resources can be accessed by a single process at one time, wherein each of the plurality of local caches is associated with a processor from the plurality of CPUs; and
    a buffer cache manager to manage reallocating buffers from the global cache to the free cache and from the free cache to the local cache, wherein the buffer cache manager comprises:
        a pre-allocator to pre-allocate resources necessary to service a request by determining whether the necessary resources are present in the local cache and, if the necessary resources are not present in the local cache, attempting to transfer some resources from the free cache to the local cache,
        a refill component to transfer some resources from the global cache to the free cache if the amount of resources in the free cache is below a watermark; and
        a reservation counter to keep track of an amount of resources in the free cache that is reserved for transfer to a local cache.

* * * * *